United States Patent [19]

Givens

[11] 4,387,302

[45] Jun. 7, 1983

[54] MEASURING OF GAMMA-RAY ENERGY DUE TO INELASTIC NEUTRON SCATTERING

[75] Inventor: Wyatt W. Givens, Dallas, Tex.

[73] Assignee: Mobil Oil Corporation, New York, N.Y.

[21] Appl. No.: 221,480

[22] Filed: Dec. 30, 1980

[51] Int. Cl.³ ............................................. G01V 5/00
[52] U.S. Cl. ................................. 250/270; 250/253
[58] Field of Search ............... 250/253, 269, 270, 390, 250/391; 376/159, 161, 162

[56] References Cited

U.S. PATENT DOCUMENTS

| | | | |
|---|---|---|---|
| 2,922,886 | 1/1960 | Putman | 250/390 |
| 3,792,253 | 2/1974 | Wylie et al. | 376/159 |
| 3,940,610 | 2/1976 | Dennis et al. | 250/253 |
| 4,136,279 | 1/1979 | Hopkinson | 250/270 |

Primary Examiner—Alfred E. Smith
Assistant Examiner—Janice A. Howell
Attorney, Agent, or Firm—Charles A. Huggett; Michael G. Gilman; George W. Hager

[57] ABSTRACT

A source of fast neutrons is pulsed to irradiate the formations surrounding a borehole with neutrons to produce inelastic neutron scattering in metallic materials located within the formations. Gamma-rays emitted from the formations in response to the inelastic neutron scattering from the metallic materials is detected as an indication of the presence of such materials within the formations.

6 Claims, 3 Drawing Figures

MEASURING OF GAMMA-RAY ENERGY DUE TO INELASTIC NEUTRON SCATTERING

BACKGROUND OF THE INVENTION

A number of methods are known and have been made commercially available in the well logging art for studying the radioactive properties of earth formation, both where the radioactivity is natural and where it is artificially induced. Logs of such properties aid immeasurably in the study of the nature of the subsurface formation, particularly in exploration for mineral or petroleum deposits of such quantities as to make them commercially inviting. One such method relates to the analysis of the energy spectrum of gamma radiation artificially produced in formations adjacent a borehole.

SUMMARY OF THE INVENTION

In accordance with the present invention, a metallic material bearing formation traversed by a borehole is irradiated with neutrons of sufficient energy to produce gamma-rays from inelastic neutron scattering in the metallic material in the formation. Such gamma-rays are measured as an indication of the presence of the metallic materials in the formation.

In one embodiment of the invention, gamma-rays are detected within energy bands which primarily identify the concentrations of copper and nickel with the formations.

DESCRIPTION OF THE PREFERRED EMBODIMENT

Figure 1:
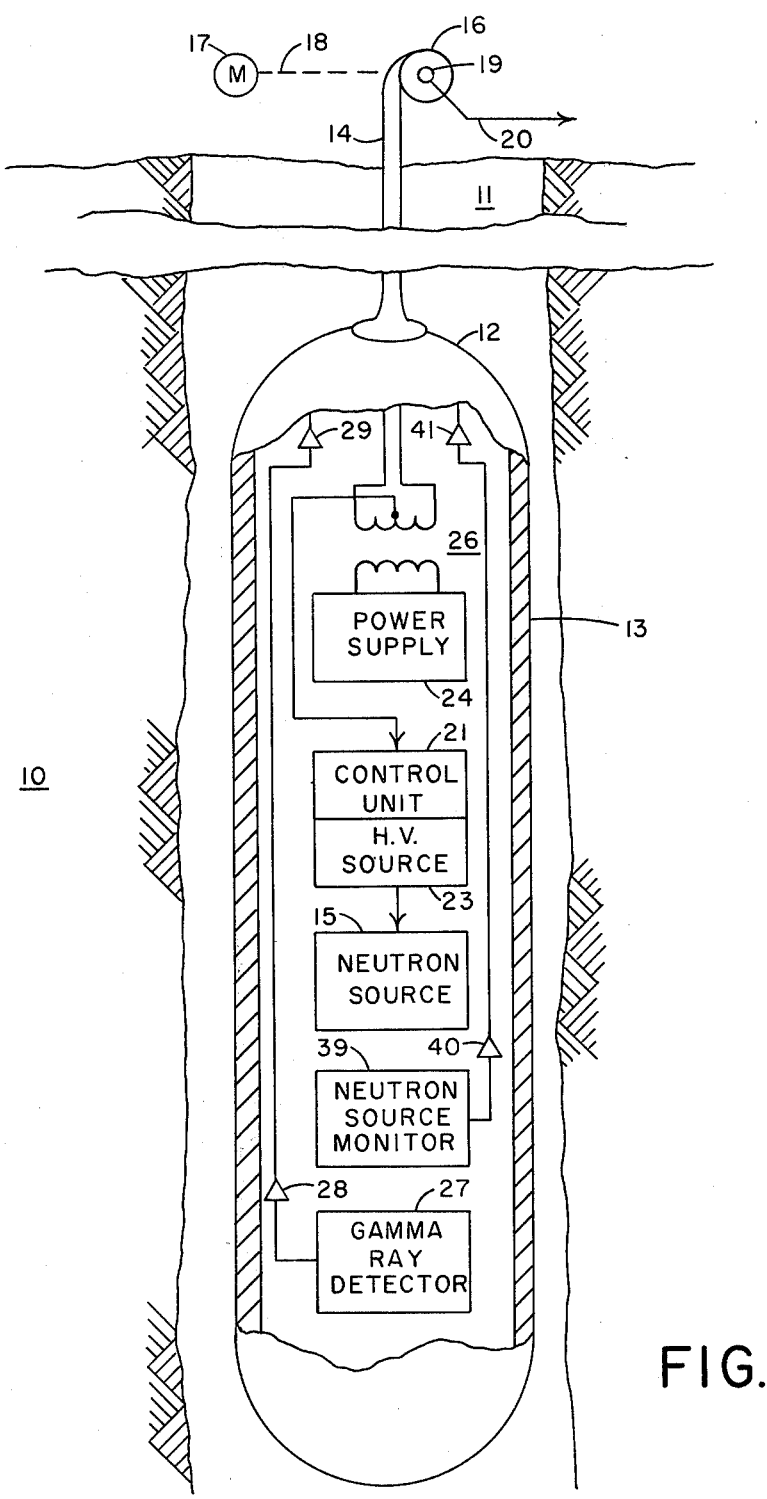
FIG. 1 illustrates the gamma radiation borehole logging system of the present invention.
Figure 3:
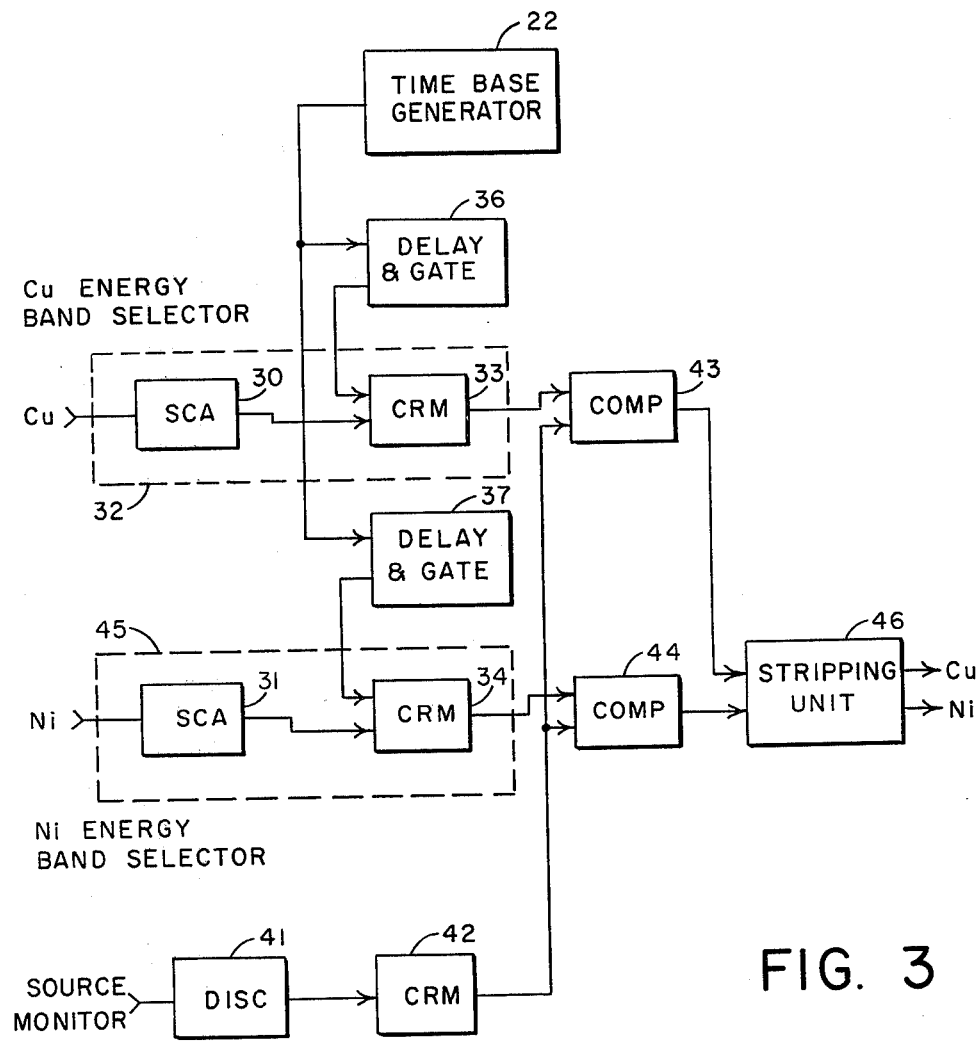
FIG. 3 is an electrical schematic of the uphole recording equipment for use in processing the gamma radiation measurements carried out by the borehole logging system of FIG. 1.

Referring to FIG. 1, there is illustrated a borehole assay tool and recording system for carrying out the logging operation of the present invention. The formation to be investigated or assayed is shown at 10. It is traversed by a borehole 11. Assaying is carried out by lowering the assay tool 12 into the borehole to the level of the formation 10. The assay tool 12 comprises a housing 13 which is suspended in the borehole 11 by means of a logging cable 14 and in which the neutron source 15 and the gamma-ray detector 27 are located. The cable 14 is driven from the drum 16 by the motor 17 and the connection 18. Slip rings 19 and brushes 20 are employed to couple the conductors of cable 14 to the uphole recording system of FIG. 3 for the transmission of signals and voltages.

In one embodiment, the neutron source 14 is a relatively moderate energy deuterium-deuterium source producing neutrons of about 2.5 MEV. Pulsing of the neutron source 14 is carried out in response to a trigger pulse supplied by the uphole system. The output of the neutron generator tube is a burst of fast neutrons spaced in time for irradiation of the formation 10. More particularly, a control unit 21, in response to pulses from an uphole time base generator, controls the application of high voltage pulses to the ion source of the neutron tube in the neutron source 15. High voltage source 23 provides a d.c. voltage to the target of the neutron tube. The pulse rate may be in the order of 20 kilohertz and the duration of each pulse in the order of 5 to 10 microseconds.

Power for the remaining electronics of the assay tool is supplied by the downhole power source 24. Power to this downhole source is supplied from the uphole power source 25 (not shown) by way of the downhole transformer 26. For simplicity, connection is not shown between the downhole power source 24 and the other downhole electronics.

The gamma-ray detector 27 is preferably an NaI scintillation detector which is utilized to measure the gamma-rays emitted from the surrounding borehole formation 10 when irradiated with neutrons from the 2.5 MEV neutron source 15. The output of gamma-ray detector 27 is applied uphole by means of a preamplifier 28 and amplifier 29 to the copper and nickel energy band selectors 32 and 45. Energy band selector 32 includes the single channel analyzer 30 and count rate meter 33. Energy band selector 45 includes the single channel analyzer 31 and count rate meter 34.

Figure 2:
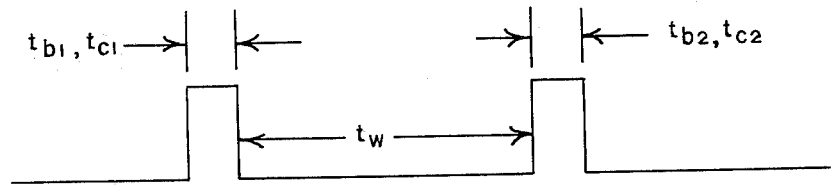
FIG. 2 is a timing diagram representative of the cyclical operation of the borehole logging system of FIG. 1.

It is a specific feature of the present invention to identify those gamma-rays emitted from formations surrounding the borehole in response to inelastic neutron scattering in select, metallic materials within such formation. To carry out this feature, the delay and gate generators 36–37 provide gating pulses for the duration of the desired gamma-ray counting period $t_c$, which, for gamma-rays emitted from inelastic neutron scattering is the same as the burst period $t_b$ during which the neutron source is energized and irradiating the formation with neutrons. This is illustrated in FIG. 2 wherein the count period $t_{c1}$ and burst period $t_{b1}$ is followed by the waiting period $t_w$ until the next count period $t_{c2}$ and burst period $t_{b2}$. As mentioned previously, a preferred time period for $t_c$ and $t_b$ is in the order of 5 to 10 microseconds at a frequency of about 20 kilohertz.

These gating pulses are applied to the count rate meters 33–34 for permitting the counting of those gamma-rays applied to the count rate meters from the single-channel analyzers 30–31 respectively. Each of the single-channel analyzers is biased to be selectively responsive to a gamma-ray from a select one of the desired metallic materials in the formation surrounding the borehole. Single-channel analyzer 30 provides a window set around pulse heights produced by gamma-rays having energies of 0.9 to 1.2 MEV, which is a characteristic bond centered about the energy level at which copper energy exhibits peak gamma radiation intensity as a result of inelastic scattering of the copper in the formation. Single-channel analyzer 31 provides a window set around pulse heights produced by gamma-rays having energies of 1.2 to 1.6 MEV; which is a characteristic energy bond centered about the energy level at which nickel exhibits peak gamma radiation intensity as a result of inelastic scattering of the nickel in the formation.

The outputs of the count rate meters 33–34 therefore provide a gross qualitiative indication of the iron, copper and nickel components respectively of the metallic materials surrounding the borehole. To provide for a quantitative indication of such metallic components, these gamma-ray count outputs of count rate meters 33–34 need to be adjusted to compensate for variations in the intensity of the neutron source during each of the neutron burst periods. In U.S. patent application Ser.

No. 951,696, filed Oct. 16, 1978, to W. R. Mills, Jr. which is incorporated herein by reference, there is disclosed a source monitoring system based upon the use of a fast neutron detector that views the neutron source directly and for which interactions occur between source neutrons and the detector-sensing material that are different from the interactions occurring between nonsource neutrons and the detector-sensing material. Such a fast neutron detector 39 is spaced from the neutron source 15 so that it does not go into a state of saturation at the burst repetition rate of the neutron source, but rather produces an output that is a linear measure of source output.

The output of the fast neutron detector 39 is transmitted by way of uphole amplifier 40 to the discriminator 41 which is biased to pass source neutrons but none of the nonsource neutrons from the formation. Count rate meter 42 counts the pulses from discriminator 41 and provides an output identifying the fast neutron flux output of the neutron source.

The output of count rate meter 42 is applied as one input to the comparators 43–44. The other input to these comparators is applied from the count rate meters 33–34 respectively. Comparator 43 compensates the copper gamma-ray count from count rate meter 33 for neutron source variations. Comparator 44 compensates the nickel gamma-ray count from count rate meter 34 for neutron source variation. Consequently the outputs of comparators 43–44 are quantitative indicative of the copper and nickel contents of the formation.

Preferably, comparators 43–44 include at least one operational amplifier with feedback and biasing resistors selected to produce the desired quantitative metallic content in response to neutron source variation.

As noted previously, the single-channel analyzers 30–31 discriminate the gamma-ray signals from the gamma-ray detector 27 into copper and nickel energy bond signals centered about the energy levels at which copper and nickel exhibit peak gamma radiation intensities. However, the higher energy gamma radiation of nickel may influence the lower energy gamma radiation of copper. It is therefore, a further aspect of the invention to apply the copper and nickel measurements to a stripping unit 46 which strips the copper gamma radiation measurement, as represented by the copper energy band signal from single-channel analyzer 30, of any influence from the nickel gamma radiation. One such suitable stripping unit for radioactive measurements is described in U.S. Pat. No. 3,940,610 to Dennis et al and reference may be made to such patent for a more detailed description of the configuration and operation of such a stripping unit.

Various modifications to the disclosed embodiment, as well as alternate embodiments, may become apparent to one skilled in the art without departing from the scope and spirit of the invention as hereinafter defined by the appended claims.

What is claimed is:

1. The method of identifying copper material in formations adjacent a borehole which comprises:
    (a) pulsing a source of fast neutrons to irradiate the formations surrounding the borehole with neutrons having energies sufficient to excite inelastic neutron scattering in copper materials within said formations,
    (b) detecting gamma-rays emitted from the formations in response to the inelastic neutron scattering from said copper materials simultaneously with the occurence of said fast neutrons, and
    (c) recording said detected gamma-rays that lie within an energy band of from about 0.9 MEV to 1.2 MEV as a function of borehole depth to produce a record primarily dependent upon the concentration of copper in said formation.

2. The method of claim 1 further comprising the step of detecting fast neutrons directly from said neutron source.

3. The method of claim 2 wherein the count of fast neutrons from said neutron source is compared with the count of gamma-rays for copper material to compensate said count of gamma-rays for variations in the output of said neutron source and thereby provide a quantitative indication of the copper material content within the formations surrounding the borehole.

4. The method of identifying nickel material in formations adjacent a borehole which comprises:
    (a) pulsing a source of fast neutrons to irradiate the formations surrounding the borehole with neutrons having energies sufficient to excite inelastic neutron scattering in nickel materials within said formations,
    (b) detecting gamma-rays emitted from the formations in response to the inelastic neutron scattering from said nickel materials simultaneously with the occurence of said fast neutrons, and
    (c) recording said detected gamma-rays that lie within an energy band of from about 1.2 MEV to 1.6 MEV as a function of borehole depth to produce a record primarily dependent upon the concentration of nickel in said formation.

5. The method of claim 4 further comprising the step of detecting fast neutrons directly from said neutron source.

6. The method of claim 4 wherein the count of fast neutrons from said neutron source is compared with the count of gamma-rays for nickel material to compensate said count of gamma-rays for variations in the output of said neutron source and thereby provide a quantitative indication of the nickel material content within the formations surrounding the borehole.

* * * * *

UNITED STATES PATENT AND TRADEMARK OFFICE
CERTIFICATE OF CORRECTION

PATENT NO. : 4,387,302
DATED : June 7, 1983
INVENTOR(S) : Wyatt W. Givens

It is certified that error appears in the above-identified patent and that said Letters Patent are hereby corrected as shown below:

| | |
|---|---|
| Title, | "Measuring" should read --Measurement--. |
| Column 1, line 28, | "with" should read --within--. |
| Column 4, line 49, | "claim 4" should read --claim 5--. |

Signed and Sealed this

Thirtieth Day of August 1983

|SEAL|

Attest:

Attesting Officer

GERALD J. MOSSINGHOFF

*Commissioner of Patents and Trademarks*